(12) United States Patent  (10) Patent No.: US 6,671,661 B1
Bishop  (45) Date of Patent: Dec. 30, 2003

(54) BAYESIAN PRINCIPAL COMPONENT ANALYSIS

(75) Inventor: Christopher Bishop, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/314,378

(22) Filed: May 19, 1999

(51) Int. Cl.$^7$ .............................................. G06F 17/50
(52) U.S. Cl. ................................ 703/2; 706/16; 706/20
(58) Field of Search ........................ 703/1, 2, 3; 706/16, 706/20, 46; 382/13, 22; 345/419, 473; 704/240

(56) References Cited

U.S. PATENT DOCUMENTS

| | | | | |
|---|---|---|---|---|
| 5,325,445 A | * | 6/1994 | Herbert | 382/38 |
| 5,343,537 A | * | 8/1994 | Bellegarda et al. | 382/13 |
| 5,465,321 A | * | 11/1995 | Smyth | 395/22 |
| 5,754,681 A | * | 5/1998 | Watanabe et al. | 382/159 |
| 5,796,924 A | * | 8/1998 | Errico et al. | 395/23 |
| 5,949,678 A | * | 9/1999 | Wold et al. | 364/188 |
| 5,963,591 A | * | 10/1999 | O'Brien et al. | 375/227 |
| 6,128,587 A | * | 10/2000 | Sjolander | 703/2 |
| 6,212,509 B1 | * | 4/2001 | Pao et al. | 706/16 |
| 6,262,730 B1 | * | 7/2001 | Horvitz et al. | 345/337 |
| 6,263,103 B1 | * | 7/2001 | Freeman et al. | 382/173 |
| 6,336,108 B1 | * | 1/2002 | Thiesson et al. | 706/20 |
| 6,380,934 B1 | * | 4/2002 | Freeman et al. | 345/419 |

OTHER PUBLICATIONS

Liu and Wechsler, "A Unified Bayesian Framework for Face Recognition", IEEE, 1998, pp. 151–155.*
Bishop, Christopher, "Variational Principal Components", Artificial Neural Networks, Sep. 1999, IEE 1999, pp. 509–14.*
Bishop, Christopher M. *Neural Networks for Pattern Recognition*. Published by Oxford University Press in 1995.
Christopher M. Bishop, Neural Networks for Pattern Recognition, Nov. 1995, Oxford University Press, ISBN 0198538642.
Michael E. Tipping, Christopher M. Bishop, Probabilistic Principal Component Analysis, Technical Report NCRG/97/010, Sep. 4, 1997, pp. 1–13.
Michael E. Tipping, Christopher M. Bishop, Mixtures of Probabilistic Principal Component Analyers, Technical Report NCRG/97/003, Jul. 11, 1998.
Radford M. Neal, Probabilstic Inference Using Markov Chain Monte Carlo Methods, Technical Report CRG–TR–93–1, Sep. 25, 1993.
David J C MacKay, Probable networks and plausible predictions—a review of practical Bayesian methods for supervised neural networks, Network: Computation in Neural Systems 6 (3), 469–505, 1995.
Michael E. Tipping and Christopher M. Bishop, Mixtures of Principal Component Analyzers, Artificial Neural Networks, Jul. 7–9, 1997, Conference Publication No. 440, Fifth International Conference Artifical Neural Networks.

* cited by examiner

*Primary Examiner*—Samuel Broda
*Assistant Examiner*—T. Phan
(74) *Attorney, Agent, or Firm*—Amin & Turocy, LLP

(57) ABSTRACT

Bayesian principal component analysis. In one embodiment, a computer-implemented method for performing Bayesian PCA including inputting a data model; receiving a prior distribution of the data model; determining a posterior distribution; generating output data based on the posterior distribution (such as, a data model, a plurality of principal components, and/or a distribution); and, outputting the output data. In another embodiment, a computer-implemented method including inputting a mixture of a plurality of data spaces; determining a maximum number of principal components for each of the data spaces within the mixture; and, outputting the maximum number of principal components for each of the data spaces within the mixture.

25 Claims, 10 Drawing Sheets

BAYESIAN PRINCIPAL COMPONENT ANALYSIS

FIELD OF THE INVENTION

This invention relates generally to data modeling and analysis such as principal component analysis, and more particularly to Bayesian principal component analysis.

BACKGROUND OF THE INVENTION

Data modeling has become an important tool in solving complex and large real-world computerizable problems. Applications of data modeling include data compression, density estimation and data visualization. A data modeling technique used for these and other applications is principal component analysis (PCA). It has proven to be a popular technique for data modeling applications, such as data compression, image analysis, visualization, pattern recognition, regression, and time-series prediction. Other data modeling applications in which PCA can be applied are density modeling for emission densities in speech recognition, clustering of data for data mining applications, and building class-conditional density models for handwriting recognition.

A common definition of PCA is that for a set D of observed d-dimensional data vectors $\{t_n\}$, $n \in \{1, \ldots, N\}$, the q principal axes $w_j$, $j \in \{1, \ldots, q\}$, are those orthonormal axes onto which the retained variance under projection is maximal. As those of ordinary skill within the art can appreciate, it can be shown that the vectors $w_j$ are given by the q dominant eigenvectors (those with the largest associated eigenvalues) of the sample covariance matrix $S=\Sigma_n(t_n-\bar{t})(t_n-\bar{t})^T/N$ such that $Sw_j=\lambda_j w_j$ and where $\bar{t}$ is the sample mean. The vector $x_n=W^T(t_n-\bar{t})$, where $W=(w_1, w_2, \ldots, W_q)$, is thus a q-dimensional reduced representation of the observed vector $t_n$.

A limitation of conventional PCA is that it does not define a probability distribution. However, as described in the reference M. E. Tipping and C. M. Bishop, Probabilistic principal component analysis (1997), PCA can be reformulated as the maximum likelihood solution of a specific latent variable model. This solution is referred to as probabilistic PCA. However, as with conventional PCA, the model utilized provides no mechanism for determining the value of the latent-space dimensionality q. For q=d-1 the model is equivalent to a full-covariance Gaussian distribution, while for q<d-1 it represents a constrained Gaussian distribution in which the variance in the remaining d-q directions is modeled by a single parameter $\sigma^2$. Thus, the choice of q corresponds to a problem in model complexity optimization. If data is plentiful, then cross-validation to compare all possible values of q offers a possible approach. However, this can quickly become intractable for mixtures of probabilistic PCA models if each component is desired to have its own q value.

For these and other reasons, there is a need for the present invention.

SUMMARY OF THE INVENTION

The invention relates to Bayesian principal component analysis. In one embodiment, a computer-implemented method for performing Bayesian PCA includes inputting a data model; receiving a prior distribution of the data model; determining a posterior distribution; generating output data based on the posterior distribution (such as, a data model, a plurality of principal components, and/or a distribution); and, outputting the output data. In another embodiment, a computer-implemented method includes inputting a mixture of a plurality of data spaces; determining a maximum number of principal components for each of the data spaces within the mixture; and, outputting the maximum number of principal components for each of the data spaces within the mixture.

Thus, the invention provides for a Bayesian treatment of PCA. A prior distribution, such as $P(\mu, W, \sigma^2)$, is received over the parameters of the inputted data model. The corresponding posterior distribution, such as $P(\mu, W, \sigma^2|D)$, is then obtained, for example, by multiplying the prior distribution by the likelihood function, and normalizing. In one embodiment, the output data is generated by obtaining a predictive density, by marginalizing over the parameters, so that $$P(t|D) = \int\int\int P(t|\mu, W, \sigma^2)P(\mu, W, \sigma^2|D)d\mu dW d\sigma^2$$

To implement this framework, embodiments of the invention address two issues: the choice of prior distribution, and the formulation of a tractable algorithm. Thus, embodiments of the invention control the effective dimensionality of the latent space (corresponding to the number of retained principal components). Furthermore, embodiments of the invention avoid discrete model selection and instead utilize continuous hyper-parameters to determine automatically an appropriate effective dimensionality for the latent space as part of the process of Bayesian inference.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
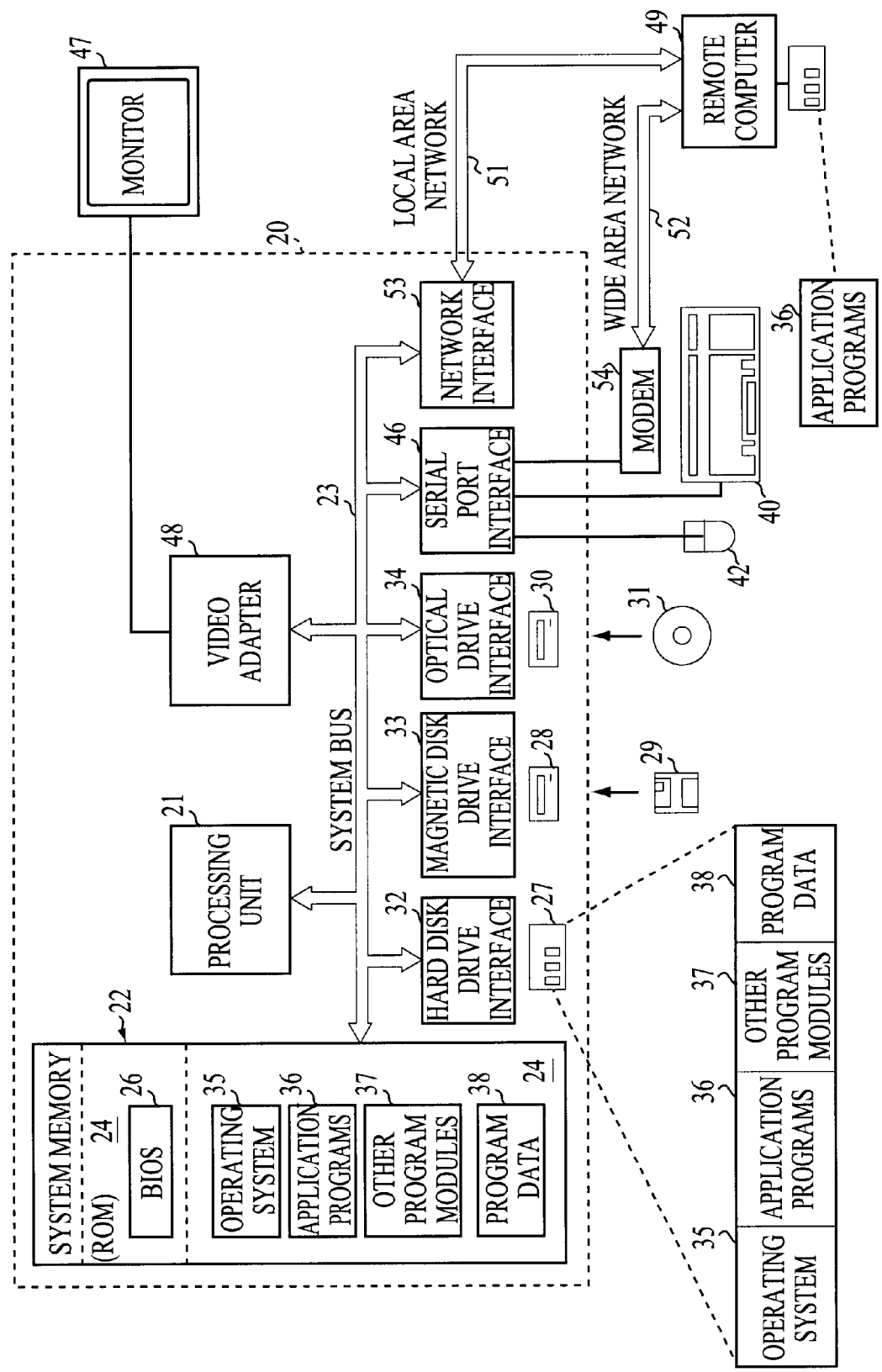
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Probabilistic Principal Component Analysis

In this and succeeding sections of the detailed description, a mathematical foundation is laid in conjunction with which embodiments of the invention can be practiced. Within successive sections of the detailed description, specific computer-implemented methods and computerized systems are presented which represent novel statutory subject matter. In this section of the detailed description specifically, probabilistic PCA is described as background information. Probabilistic PCA is also referred to as maximum likelihood PCA.

Consider a data set D of observed d-dimensional vectors $D=\{t_n\}$ where $n \in \{1, \ldots, N\}$. Conventional principal component analysis is obtained by first computing the sample covariance matrix given by $$S = \frac{1}{N} \sum_{n=1}^{N} (t_n - \bar{t})(t_n - \bar{t})^T \tag{1}$$

where $t=N\Sigma t_n$ is the sample mean. Next the eigenvectors $u_i$ and eigenvalues $k_i$ of S are found, where $Su_i=\lambda_i u_i$ and $i=1, \ldots, d$. The eigenvectors corresponding to the q largest eigenvalues (where q<d) are retained, and a reduced-dimensionality representation of the data set is defined by $X_m=U^T(t_n-\bar{t})$ where $U_q=(u_1, \ldots, U_q)$. Those of ordinary skill within the art can appreciate that it is easily shown that PCA corresponds to the linear projection of a data set under which the retained variance is a maximum, or equivalently the linear projection for which the sum-of-squares reconstruction cost is minimized.

As has been stated in the background, a limitation of conventional PCA is that it does not define a probability distribution. However, as described in the Tipping and Bishop reference referred to in the background, PCA can be reformulated as the maximum likelihood solution of a specific latent variable models. This is as follows. A q-dimensional latent variable x is first introduced, having a prior distribution that is a zero mean, unit covariance Gaussian $P(x)=N(O,I_q)$ and $I_q$ is the q-dimensional unit matrix. The observed variable t is then defined as a linear transformation of x with additive Gaussian noise $t=W_x+\mu+\epsilon$ where W is a d×q matrix, $\mu 0$ is a d-dimensional vector, and $\epsilon$ is a zero-mean Gaussian-distributed vector with covariance a $\sigma^2 I_d$. Thus, $P(t|x)=N(Wx+\mu\sigma^2 I_d)$. The marginal distribution of the observed variable is then given by the convolution of two Gaussians, and is itself Gaussian, $$P(t) = \int P(t|x)P(x)dx = N(\mu, C) \tag{2}$$

where the covariance matrix $C=WW^T+\sigma^2 I^d$. The model (2) represents a constrained Gaussian distribution governed by the parameters $\mu$, W, and $\sigma^2$.

The log probability of the parameters under the observed data set D is then given by $$L(\mu, W, \sigma^2) = -\frac{N}{2} \{d \ln(2\pi) + \ln|C| + Tr[C^{-1}S]\} \tag{3}$$

where S is the sample covariance matrix given by (1). The maximum likelihood solution for $\mu$ is seen to be $\mu_{ML}=\bar{t}$. It is shown in the Tipping and Bishop reference referred to in the background section that the stationary points of the log likelihood with respect to W satisfy $$W_{ML}=U_q(\Lambda_q-\sigma^2 I_q)^{1/2} \tag{4}$$

where the columns of $U_q$ are eigenvectors of S, with corresponding eigenvalues in the diagonal matrix $\Lambda_q$. It is also shown in this reference that the maximum of the likelihood is achieved when the q largest eigenvalues are chosen, so that the columns of $U_q$ correspond to the principal eigenvectors, with all other choices of eigenvalues corresponding to saddle points. The maximum likelihood solution for $\sigma^2$ is then given by $$\sigma^2_{ML} = \frac{1}{d-q} \sum_{i=q+1}^{d} \lambda_i \tag{5}$$

which has a natural interpretation as the average variance lost per discarded dimension. The density model (2) thus represents a probabilistic formulation of PCA. It is easily verified that the conventional PCA is recovered in the limit $\sigma^2 \to 0$.

As has been stated, and as with conventional PCA, the probabilistic PCA model itself provides no mechanism for determining the value of the latent-space dimensionality q. For q=d−1, the model is equivalent to a full-covariance Gaussian distribution, while for q<d−i it represents a constrained Gaussian in which the variance in the remaining d−q directions is modeled by the single parameter $\sigma^2$. Thus, the choice of q corresponds to a problem in model complexity operation. If data is plentiful, then cross-validation to compare all possible values of q offers a possible approach. However, this can quickly become intractable for mixtures of probabilistic PCA models if each component is desired to have its own q value.

Bayesian Principal Component Analysis

In this section of the detailed description, a Bayesian treatment of PCA is presented, utilizing the probabilistic reformulation of PCA defined in the previous section of the detailed description. A prior distribution, such as $P(\mu, W, W, \sigma^2)$, is received over the parameters of the inputted data model. The corresponding posterior distribution, such as $P(\mu, W, \sigma^2|D)$, is then obtained, for example, by multiplying the prior distribution by the likelihood function, and normalizing. In one embodiment, the output data is generated by obtaining a predictive density, by marginalizing over the parameters, so that $$P(t|D) = \int\int\int P(\mu, W, \sigma^2) P(\mu, W, \sigma^2|D) d\mu dW d\sigma^2. \quad (6)$$

To implement this framework, embodiments of the invention address two issues: the choice of prior distribution, and the formulation of a tractable algorithm. Embodiments of the invention control the effective dimensionality of the latent space (corresponding to the number of retained principal components). Furthermore, embodiments of the invention avoid discrete model selection and instead utilize continuous hyper-parameters to determine automatically an appropriate effective dimensionality for the latent space as part of the process of Bayesian inference.

This is achieved in one embodiment by introducing a hierarchical prior $P(W|\alpha)$ over the matrix W, governed by a q-dimensional vector of hyper-parameters $\alpha = \{\alpha_1, \ldots, \alpha_q\}$. Each hyper-parameter controls one of the columns of the matrix W through a conditional Gaussian distribution of the form $$P(W|\alpha) = \prod_{i=1}^{q} \left(\frac{\alpha_i}{2\pi}\right)^{d/2} \exp\left\{-\frac{1}{2}\alpha_i \|w_i\|^2\right\} \quad (7)$$

where $\{w_i\}$ are the columns of W. This form of prior is motivated by the framework of automatic relevance determination (ARD) introduced in the context of neural networks as described in the reference David J. C. MacKay, Probable networks and plausible predictions—a review of practical Bayesian methods for supervised neural networks, Network: Computation in Neural Systems 6(3)(1995). Each αcontrols the inverse variance of the corresponding $w_i$, so that if a particular (xi has a posterior distribution concentrated at large values, the corresponding $w_i$ will tend to be small, and that direction in latent space will be effectively "switched off." The dimensionality of the latent space is set to its maximum possible value q=d−1.

Figure 2:
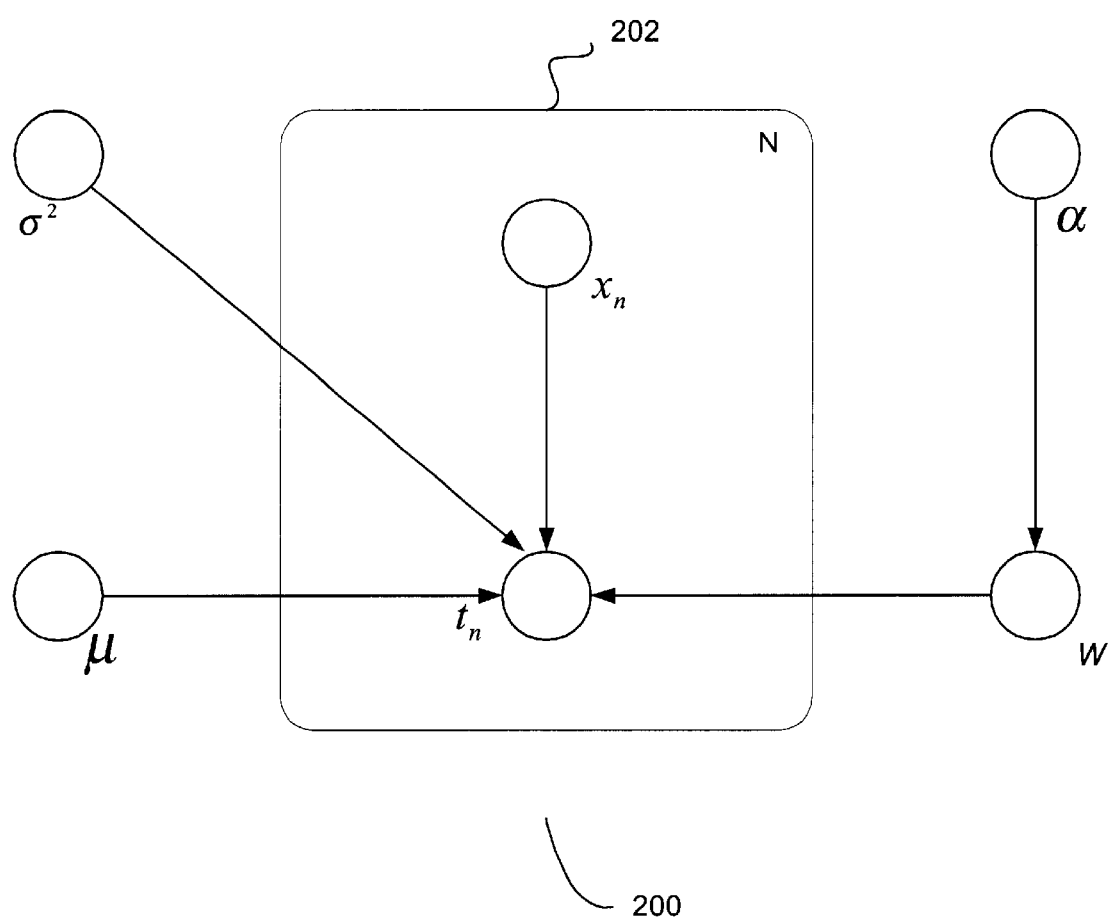
FIG. 2 is a diagram of a probabilistic structure of a Bayesian PCA model, according to an embodiment of the invention.

The probabilistic structure of the model is displayed graphically in FIG. 2. The model 200 shows the hierarchical prior over W governed by the vector of hyper-parameters α. The box 202 denotes a"plate" comprising a data set of N independent observations of the visible vector $t_n$ together with the corresponding hidden variables $x_n$.

The specification of the Bayesian model is completed by defining priors over the parameters $\mu$, α and $\sigma^2$. These desirably are very broad priors, but need to be proper in order to ensure that some of the algorithms described subsequently are well behaved. Specifically, defining $\tau \equiv 1/\sigma^2$, the following choices are made $$P(\mu) = N(\mu|0, B^{-1}) \quad (8)$$

$$P(\alpha) = \prod_{i=1}^{q} \Gamma(\alpha_i | a_\alpha, b_\alpha) \quad (9)$$

$$P(\tau) = I(\tau | c_\tau, d_\tau) \quad (10)$$

Here, N(x|m,E) denotes a multivariate normal distribution over x with mean m and covariance matrix E. Similarly, Γ(x|a,b) denotes a Gamma distribution over x given by $$\Gamma(x|a,b) = \frac{b^a x^{a-1} e^{-bx}}{\Gamma(a)} \quad (11)$$

where Γ(a) is the Gamma function. The distribution (11) has the useful properties $$\langle x \rangle = \frac{a}{b} \quad (12)$$

$$\langle x^2 \rangle - \langle x \rangle^2 = \frac{a}{b^2}. \quad (13)$$

Broad priors are obtained by setting $a_\alpha = b_\alpha = a_{\tau=b\tau} = 10^{-3}$ and $B = 10^{-3}$.

For this model to be made use of, in practice the joint distribution must be able to be marginalized with respect to W, α, $\mu$, and $\sigma^2$, as well as the latent variables $\{x_n\}$—that is, a predictive density must be determined, by marginalizing the posterior distribution over the parameters of the data model. As those of ordinary skill within the art can appreciate, these integrations cannot jointly be performed analytically. Therefore, approximation frameworks must be utilized. In the next three sections of the detailed description, different approximation frameworks are described: a Laplace approximation in conjunction with type-II maximum likelihood, a variational inference based on an approximation to the posterior distribution using a factorized distribution, and a Markov chain Monte Carlo simulation based on Gibbs sampling.

Figure 9:
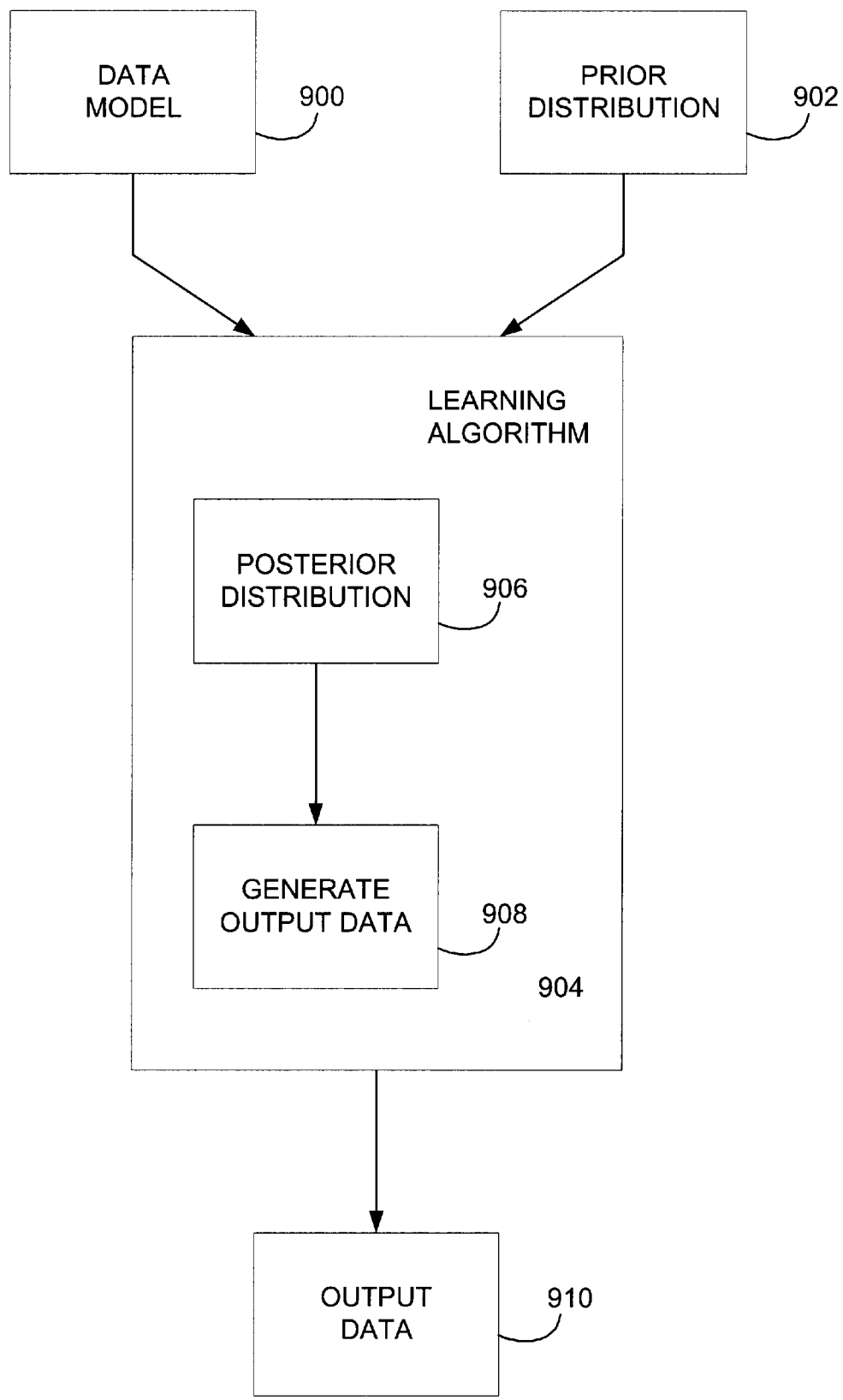
FIG. 9 is a flowchart of a method to perform Bayesian PCA, according to an embodiment of the invention; and, FIG. 10 is a computerized system according to an embodiment of the invention.

As has been described, Bayesian PCA can be accomplished according to one embodiment of the invention by a computer-implemented method, a flowchart of which is shown in FIG. 9. In 900, a data model is input. The data model may be input by being received from a communications device, from a storage device, etc.; the invention is not so limited. The data model desirably represents a real-world event or events—for example, the stories read by users of a web site, the television shows watched by viewers, etc. In 902, a prior distribution of the data model is received, which in one embodiment is hierarchical, whereas in another it is non-hierarchical.

In 904, a learning algorithm is applied to generate the output data desired—for example, a (second) data model based on Bayesian PCA, a number of principal components (viz., the optimal dimensionality) of the data model, a distribution of the data model, etc. This is specifically accomplished by performance of 906 and 908. In 906, a posterior distribution is determined based on the data model and the prior distribution. Next, in 908, the output data itself is generated based on the posterior distribution. In one embodiment, this includes determining a predictive density, including an optimal density of the data model, by marginalizing the posterior distribution over parameters of the data model. In succeeding sections of the detailed description, different manners by which this marginalization can be accomplished (and thus different manners by which the predictive density can be determined) are described, such as Laplace approximation, Markov chain Monte Carlo simulation, and variational inference.

Finally, in 910, the output data is output. The invention is not limited to the manner by which output is accomplished. For example, in one embodiment, it can be output to a further analysis program or software component, that allows for analysis and conclusions to be drawn. As another example, the output can be displayed on a displayed device, or printed to a printer, etc.

Figure 10:
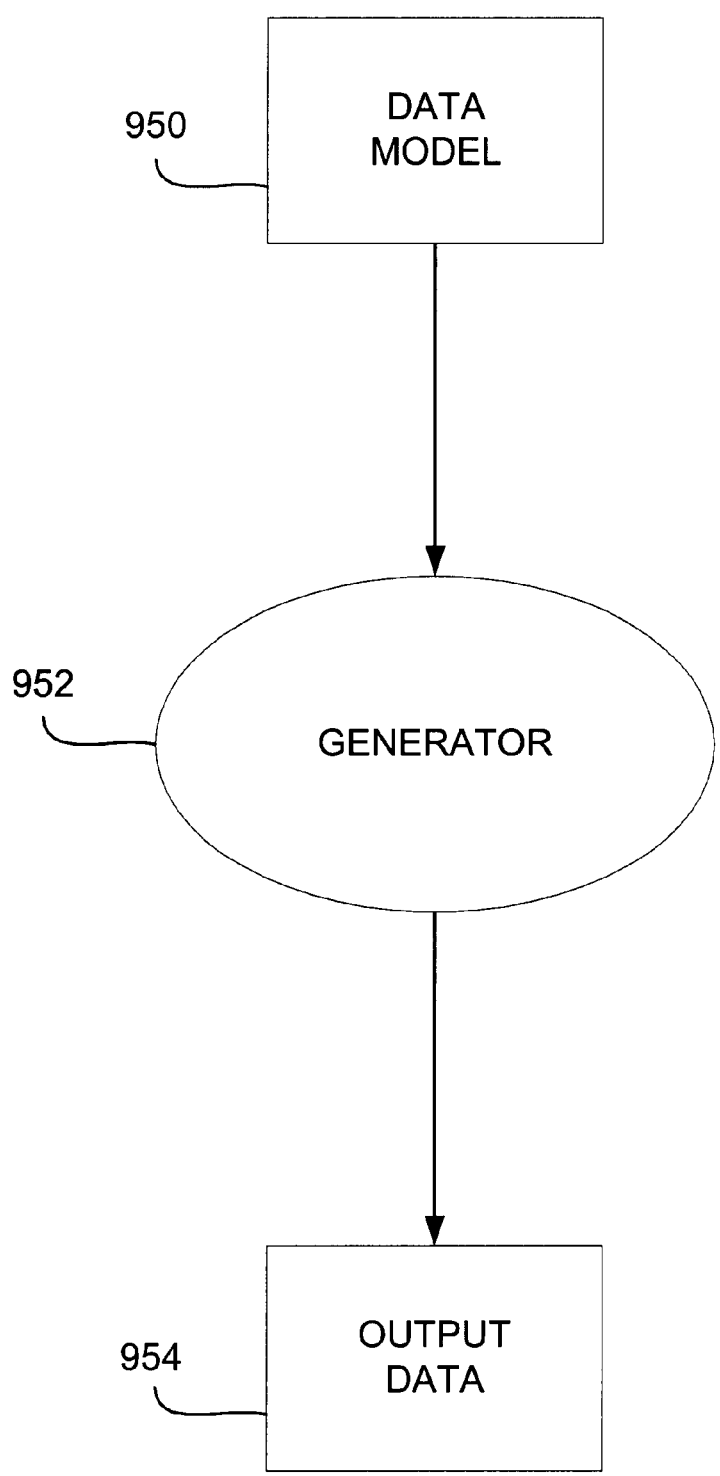

Referring next to FIG. 10, a computerized system according to an embodiment of the invention is shown. The system includes a data model 950, a generator 952, and output data 954. Each of the data model 950 and the output data 954 can in one embodiment be stored as data on a computer-readable medium, such as a memory or a hard drive. The generator 952 can in one embodiment be a computer program, executable by a processor from a computer-readable medium. The invention is not so limited, however.

The data model 950 has a prior distribution. The output data 954 is based on the data model 950 and the prior distribution thereof, and can include a second data model, a distribution, and/or a plurality of principal components. The generator 952 thus generates the output data 954 based on the data model 950 and the prior distribution thereof, by determining a posterior distribution based on the data model 950 and the prior distribution thereof, as has been described.

Laplace Approximation in Conjunction With Type II Maximum Likelihood

In this section of the detailed description, an approximation framework for marginalizing the posterior distribution over the parameters of the data model, to determine the predictive density, is presented. In particular, the approximation framework described in this section relates to performing a Laplace approximation in conjunction with type II maximum likelihood. The invention is not so limited, however.

The framework described herein involves a local quadratic approximation to the posterior distribution in the neighborhood of a mode, as described in the MacKay reference previously referred to. The location $W_{MP}$ of the mode can be found by maximizing the log posterior distribution given, from Bayes' theorem, by $$\ln P(W|D) = L - \frac{1}{2}\sum_{i=1}^{d-1} \alpha_i \|w_i\|^2 + \text{const.} \quad (14)$$

where L is given by (3). For the purpose of controlling the effective dimensionality of the latent space, it is sufficient to treat $\mu$, $\sigma^2$ and $\alpha$ as parameters whose values are to be estimated, rather than as random variables. In this case there is no need to introduce priors over these variables, and $\mu$ and $\sigma^2$ can be determined by maximum likelihood. To estimate $\alpha$ type-II maximum likelihood is used, as known within the art, corresponding to maximizing the marginal likelihood $P(D|\alpha)$ in which W has been integrated over using the quadratic approximation. This leads to a re-estimation formula for the hyper-parameters as of the form $$\alpha_i := \frac{\gamma_i}{\|w_i\|^2} \quad (15)$$

where $\gamma_i = d - \alpha_i \text{Tr}_i(H^{-1})$ is the effective number of parameters in $w_i$, H is the Hessian matrix given by the second derivatives of $\ln P(W|D)$ with respect to the elements of W (evaluated at $W_{MP}$), and $\text{Tr}_i(\cdot)$ denotes the trace of the sub-matrix corresponding to the vector $w_i$.

In one embodiment, further simplifications are then made. $\gamma_i$ is replaced in (15) by $d_i$ corresponding to the assumption that all model parameters are "well-determined." This significantly reduces the computational cost since it avoids evaluation and manipulation of the Hessian matrix. An additional consequence is that vectors $w_i$ for which there is insufficient support from the data will be driven to zero, with the corresponding $\alpha_i \to \infty$, so that unused dimensions are switched off completely. The effective dimensionality of the model is defined to be the number of vectors $w_i$ whose values remain non-zero.

The solution for $W_{MP}$ in one embodiment can be found efficiently using the EM algorithm, known within the art, in which the E-part involves evaluation of the expected sufficient statistics of the latent-space posterior distribution, given by $$\langle x_n \rangle = M^{-1} W^T (t_n - \mu) \quad (16)$$

$$\langle x_n x_n^T \rangle \sigma^2 M + \langle X_n \rangle \langle X_n \rangle^T \quad (17)$$

where $M = (W^T W + \sigma^2 I_q)$. The M-part involves updating the model parameters using $$\tilde{W} = \left[\sum_n (t_n - \mu)\langle x_n^T \rangle\right]\left[\sum_n \langle x_n x_n^T \rangle + \sigma^2 A\right]^{-1} \quad (18)$$

$$\tilde{\sigma}^2 = \frac{1}{Nd}\sum \left\{\|t_n - \mu\|^2 - 2\langle x_n^T \rangle \tilde{W}^T (t_n - \mu) + \text{Tr}[\langle x_n x_n^T \rangle \tilde{W}^T \tilde{W}]\right\} \quad (19)$$

where A diag($\alpha_i$). Optimization of W and $\sigma^2$ is alternated with re-estimation of $\alpha$, using (15) with $\gamma_i = d$, until all the parameters satisfy a suitable convergence criterion.

Figure 3:
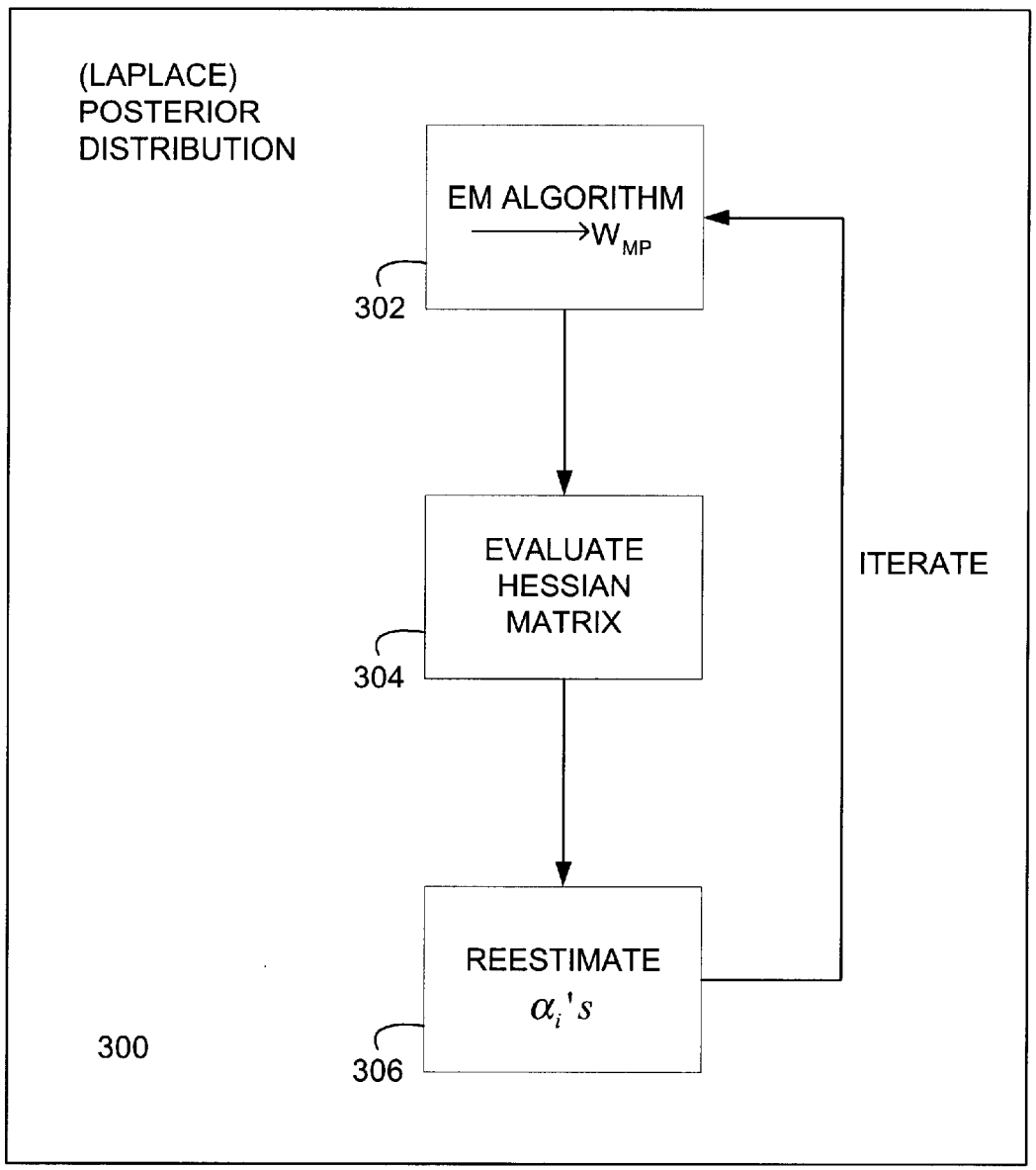
FIG. 3 is a flowchart of a method to marginalize the posterior distribution over the parameters of a data model, via a Laplace approximation in conjunction with type II maximum likelihood, according to an embodiment of the invention.

The approximation framework described in this section can be implemented in one embodiment as a computer-implemented method, a flowchart of which is shown in FIG. 3. Thus, to marginalize the posterior distribution over the parameters of the data model, as represented by 300, iteration of 302, 304 and 306 is performed until the parameters satisfy a suitable predetermined convergence criterion. In 302, the EM algorithm is performed to obtain $W_{MP}$. In 304, the Hessian matrix H is evaluated, and in 306, the hyper-parameters $\alpha_i$'s are re-estimated; if convergence has not been achieved in conjunction with the predetermined criterion, the method starts again at 302.

As can be appreciated by those of ordinary skill within the art, the computer-implemented method of FIG. 3 is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Variational Inference Based on an Approximation to the Posterior Distribution Using a Factorized Distribution In this section of the detailed description, an approximation framework for marginalizing the posterior distribution over the parameters of the data model, to determine the predictive density, is presented. In particular, the approximation framework described in this section relates to performing a variational inference based on an approximation to the posterior distribution, using a factorized distribution. The invention is not so limited, however.

Variational methods involve the introduce of an approximating distribution $Q(\theta)$ which provides an approximation to the true posterior distribution. Consider $$\ln P(D) \geq \int Q(\theta) \ln \frac{P(D, \theta)}{Q(\theta)} d\theta = L(Q) \quad (23)$$

where Jensen's inequality, known within the art, has been applied. The difference between the true log marginal likelihood ln P(D) and the bound L(Q) is given by $$KL(Q \| P) = -\int Q(\theta) \ln \frac{P(\theta/D)}{Q(\theta)} d\theta \quad (24)$$

which is the Kullback-Leibler (KL) divergence, known within the art, between the approximating distribution $Q(\theta)$ and the true posterior $P(\theta|D)$.

Thus, the goal in a variational approach is to choose a suitable form for $Q(\theta)$ which is sufficiently simple that the lower bound L(Q) can readily be evaluated and yet which is sufficiently flexible that the bound is reasonably tight. Generally, some family of Q distributions is chosen, and then the best approximation within this family is sought by maximizing the lower bound. Since the true log likelihood is independent of Q, this is equivalent to minimizing the Kullback-Leibler divergence.

Consider a completely free-form optimization over Q, allowing for all possible Q distributions. Using the well-known (within the art) result that the KL divergence between two distributions $Q(\theta)$ and $P(\theta)$ is minimized by $Q(\theta)=P(\theta)$, the optimal Q distribution is given by the true posterior, in which case the KL divergence is zero and the bound becomes exact. However, this does not lead to any simplification of the problem; in order to make progress it is necessary to consider a more restricted range of Q distributions.

One approach is to consider a parametric family of Q distributions of the form $Q(\theta,\phi)$ governed by a set of parameters $\phi$. $\phi$ can then be adapted by minimizing the KL divergence to find the best approximation within this family. An alternative approach to be considered is to restrict the functional form of $Q(\theta)$ by assuming that it factorizes over the component variables $\{\theta_i\}$ in $\theta$, so that $$Q(\theta) = \prod_i Q_i(\theta_i). \quad (25)$$

The KL divergence can then be minimized over all possible factorial distributions by performing a free-form minimization over the $Q_i$, leading $$Q_i(\theta_i) = \frac{\exp\langle \ln P(D, \theta)\rangle_{k \neq i}}{\int \exp\langle \ln P(D, \theta)\rangle_{k \neq i} d\theta_i} \quad (26)$$

To apply this framework to Bayesian PCA, a Q distribution of the form $$Q(X, W, \alpha, \mu, \tau) = Q(X)Q(W)Q(\alpha)Q(\mu)Q(\tau) \quad (27)$$

is assumed, where $X=\{X_n\}$. The true joint distribution of data and parameters is given by $$P(D, \theta) = \prod_{n=1}^{N} P(t_n | X_n, W, \mu, \tau) P(X) P(W | \alpha) P(\alpha) P(\mu) P(\tau). \quad (28)$$

Using (27) and (28) in (26), and substituting for the various $P(\cdot)$ distributions, the following results are obtained for the component distributions of $Q(\cdot)$, defining $\tilde{W}_k$ as denoting a column vector corresponding to the kth row of W, $$m_x^{(n)} = \langle \tau \rangle (I + \langle \tau \rangle \langle W^T W \rangle)^{-1} \langle W^T \rangle (t_n - \langle \mu \rangle) \quad (34)$$

$$\Sigma_x = (I + \langle \tau \rangle \langle W^T W \rangle)^{-1} \quad (35)$$

$$m_\mu = (B + N\langle \tau \rangle)^{-1} \langle \tau \rangle \sum_{n=1}^{N} (t_n - \langle W \rangle \langle x_n \rangle) \quad (36)$$

$$\Sigma_\mu = (B + N\langle \tau \rangle)^{-1} I \quad (37)$$

$$m_w^{(k)} = \left( diag\langle \alpha \rangle + \langle \tau \rangle \sum_{n=1}^{N} \langle x_n x_n^T \rangle \right)^{-1} \langle \tau \rangle \sum_{n=1}^{N} \langle x_n \rangle (t_{nk} - \langle \mu_k \rangle) \quad (38)$$

$$\Sigma_w = \left( diag\langle \alpha \rangle + \langle \tau \rangle \sum_{n=1}^{N} \langle x_n x_n^T \rangle \right)^{-1} \quad (39)$$

$$\tilde{a}_\alpha = a_\alpha + \frac{d}{2} \quad (40)$$

$$\tilde{b}_{\alpha i} = b_\alpha + \frac{\langle \|W_i\|^2 \rangle}{2} \quad (41)$$

$$\tilde{a}_\tau = a_\tau + \frac{Nd}{2} \quad (42)$$

$$\tilde{b}_\tau = b_\tau + \frac{1}{2} \sum \{\|t_n\|^2 + \langle \|\mu\|^2 \rangle + \quad (43)$$
$$Tr(\langle W^T W \rangle \langle x_n x_n^T \rangle) + 2\langle \mu^T \rangle \langle W \rangle \langle x_n \rangle - 2t_n^T \langle \mu \rangle\}$$

and $diag(\alpha)$ denotes a diagonal matrix whose diagonal elements are given by $(\alpha_i)$.

The solution for the optimal factors in the $Q(\theta)$ distribution is an implicit one since each distribution depends on the moments of the other distributions. A solution can be found numerically by starting with a suitable initial guess for the distributions and then cycling through the groups of variables in turn, re-estimating each distribution using the above results. At each re-estimation, only moments of those variables corresponding to the Markov blanket are needed.

In order to monitor the convergence of the variational optimization, it is convenient to be able to evaluate the lower bound on the marginal log likelihood. In one embodiment, the following expression is used for the lower bound, evaluated for the optimizing Q distribution, $$L(Q) = \frac{1}{2} \sum_{n=1}^{N} \langle x_n^T x_n \rangle - \sum_{i=1}^{q} (a_\alpha - 1)\langle \ln \alpha_i \rangle + \sum_{i=1}^{q} b_\alpha \langle \alpha_i \rangle - (a_\tau - 1) \quad (55)$$

$$\langle \ln \tau \rangle + b_\tau \langle \tau \rangle - \frac{d}{2} \sum_{i=1}^{q} \langle \ln \alpha_i \rangle + \frac{1}{2} \sum_{i=1}^{q} \langle \alpha_i \rangle \langle \|w_i\|^2 \rangle + \frac{\beta}{2}$$

$$\langle \mu^T \mu \rangle - \frac{Nd}{2} \langle \ln \tau \rangle + \frac{1}{2} \langle \tau \rangle \sum_{n=1}^{N} \{\|t_n\|^2 + \langle \|\mu\|^2 \rangle + Tr(\langle W^T W \rangle$$

$$\langle x_n x_n^T \rangle) + 2\langle \mu^T \rangle \langle W \rangle \langle x_n \rangle - 2t_n^T \langle W \rangle \langle x_n \rangle - 2t_n^T \langle \mu \rangle\} - \frac{N}{2} \ln$$

-continued $$|\Sigma_x| + q(\tilde{a}_{\alpha-1})\psi(\tilde{a}_\alpha) + \sum_{i=1}^{q} \ln \tilde{b}_{\alpha i} - q\tilde{a}_\alpha - q\ln\Gamma(\tilde{a}_\alpha) +$$

$$(\tilde{a}_\tau - 1)\psi(\tilde{a}_\tau) + \ln \tilde{b}_\tau - \tilde{a}_\tau - \ln\Gamma(\tilde{a}_\tau) - \frac{d}{2}\ln|\Sigma_w| - \frac{1}{2}\ln|\Sigma_\mu| + K$$

where the φ function is defined by $$\psi(a) = \frac{d}{da}\ln\Gamma(a). \qquad (56)$$

Figure 4:
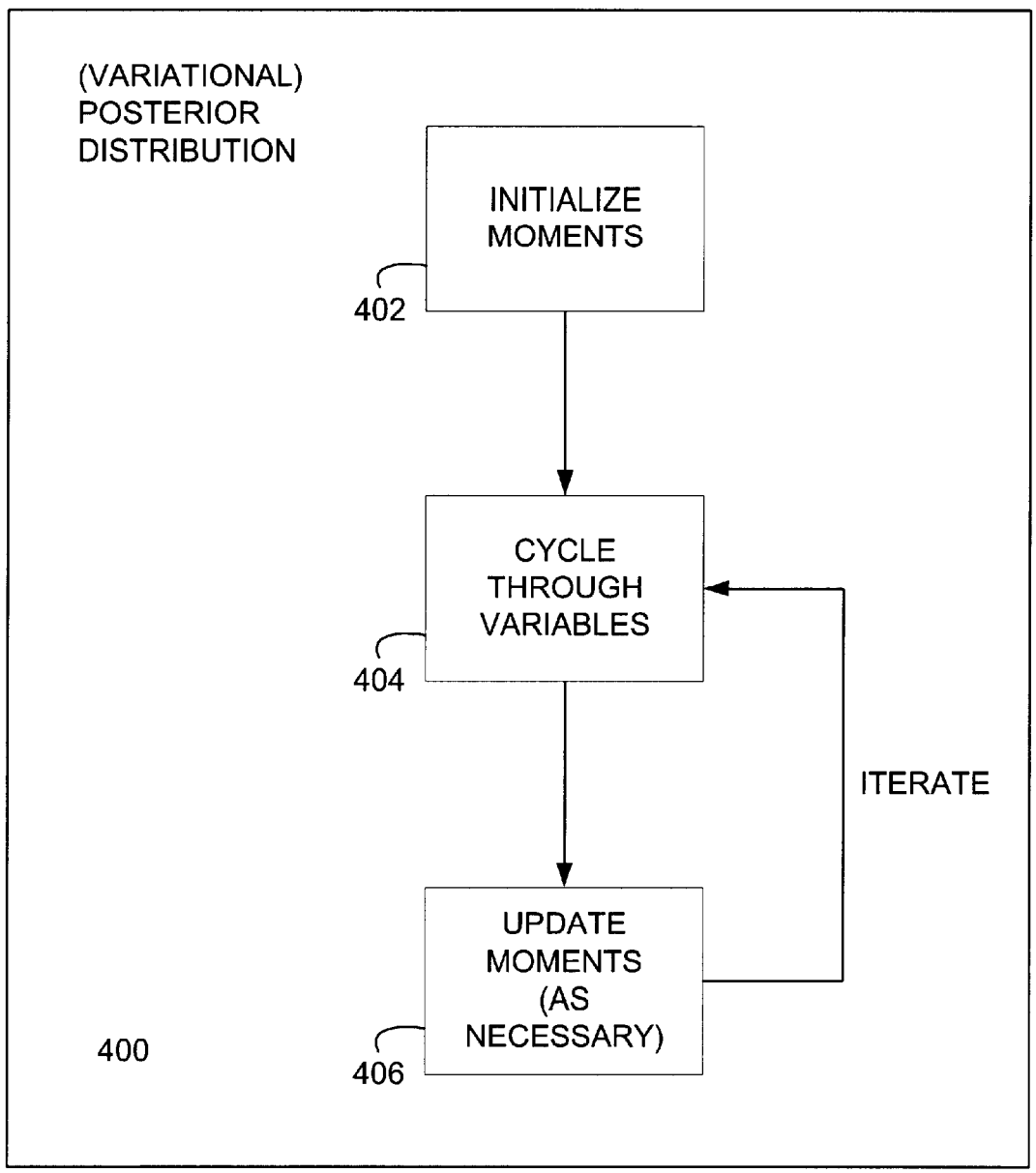
FIG. 4 is a flowchart of a method to marginalize the posterior distribution over the parameters of a data model, via a variational approximation, according to an embodiment of the invention.

The approximation framework described in this section can be implemented in one embodiment as a computer-implemented method, a flowchart of which is shown in FIG. 4. Thus, to marginalize the posterior distribution over the parameters of the data model, as represented by 400, iteration of 404 and 406 is performed (after initialization in 402) until the parameters satisfy a suitable predetermined convergence criterion. In 402, the moments are initialized. In 404, the groups of variables are cycled through in turn, re-estimating each distribution. At each re-estimation, in 406 only moments of those variables corresponding to the Markov variable need updating. If convergence has not been achieved in conjunction with the predetermined criterion, the method iterates again at 404.

As can be appreciated by those of ordinary skill within the art, the computer-implemented method of FIG. 4 is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Markov Chain Monte Carlo Simulation Based on Gibbs Sampling

In this section of the detailed description, an approximation framework for marginalizing the posterior distribution over the parameters of the data model, to determine the predictive density, is presented. In particular, the approximation framework described in this section relates to performing a Markov chain Monte Carlo simulation based on Gibbs sampling. The invention is not so limited, however. Furthermore, the invention is not limited to performing a Markov chain Monte Carlo simulation based particularly on Gibbs sampling.

Monte Carlo methods based on sampling using Markov chains are known within the art. Several different Monte Carlo methods exist, including Gibbs sampling, the Metropolis algorithm, as well as hybrid Monte Carlo methods, all of which are known within the art. Markov Chain Monte Carlo methods are described in the reference Radford M. Neal, Probabilistic Inference Using Markov Chain Monte Carlo Methods, Technical Report CRG-TR-93-1, Department of Computer Science, University of Toronto, 1993, which is hereby incorporated by reference. Application of Monte Carlo approximation methods to marginalize the posterior distribution of the data model thus is understood by those of ordinary skill within the art.

Figure 5:
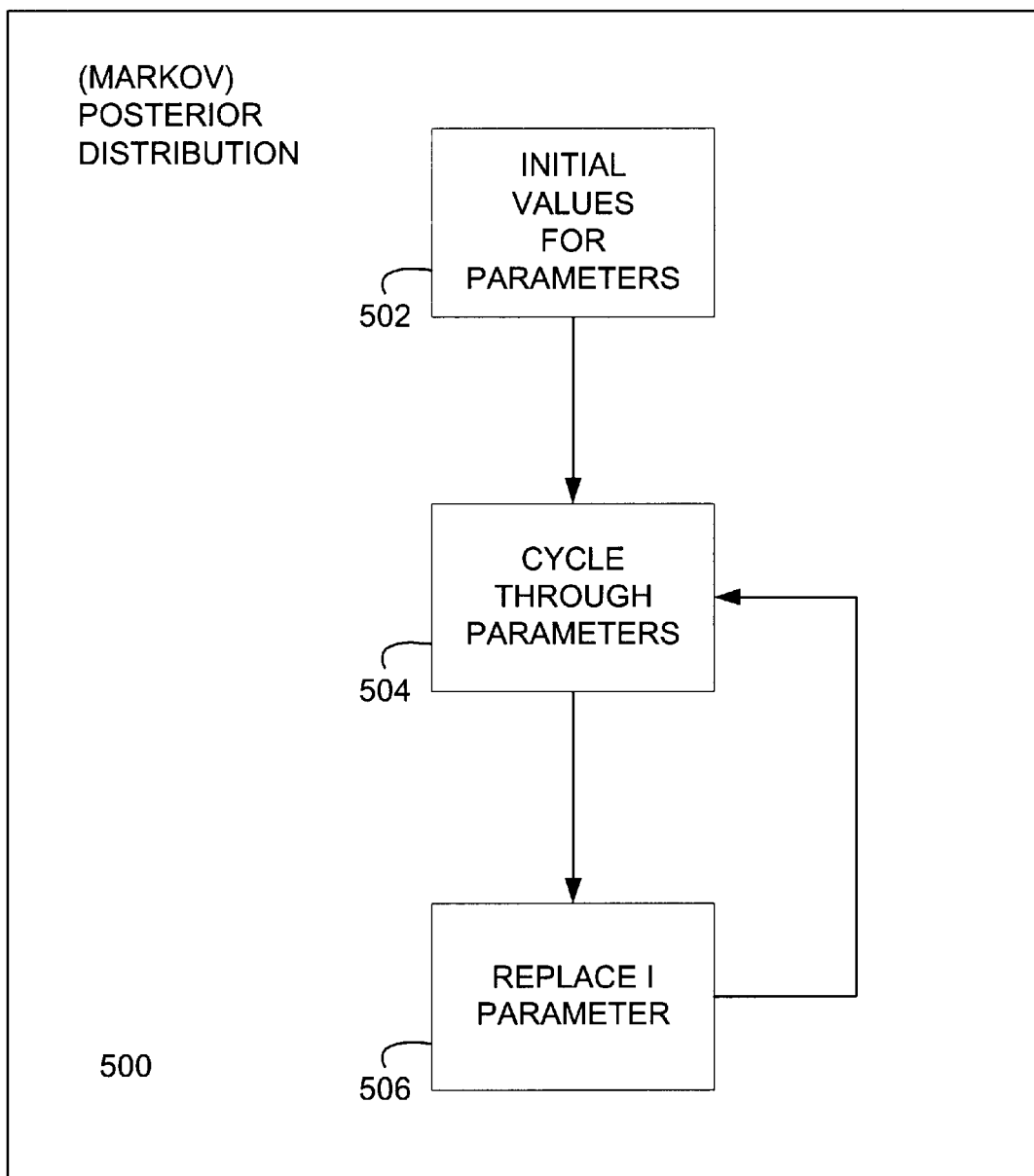
FIG. 5 is a flowchart of a method to marginalize the posterior distribution over the parameters of a data model, via Markov Chain Monte Carlo methods, according to an embodiment of the invention.

Markov Chain Monte Carlo approximation methods can be implemented in one embodiment as a computer-implemented method, a flowchart of which is shown in FIG. 5. The method of FIG. 5 is comparable to the methods of FIG. 3 and FIG. 4, in that in iterative cycling is followed. Thus, to marginalize the posterior distribution over the parameters of the data model, as represented by 500, iteration of 504 and 506 is performed (after initialization in 502) until the parameters satisfy a suitable predetermined convergence criterion. In 502, initial values for the parameters are selected. In 504, the parameters are cycled through, such that in 506 one parameter is replaced in accordance with Markov chain Monte Carlo methods as known within the art. If convergence has not been achieved in conjunction with the predetermined criterion, the method iterates again at 504. (It is noted, as can be appreciated by those of ordinary skill within the art, that the parameters of FIG. 5 are the variables of FIG. 4, even though the terminology is a bit different.)

As can be appreciated by those of ordinary skill within the art, the computer-implemented method of FIG. 5 is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Mixtures of Bayesian PCA Models

Figure 6:
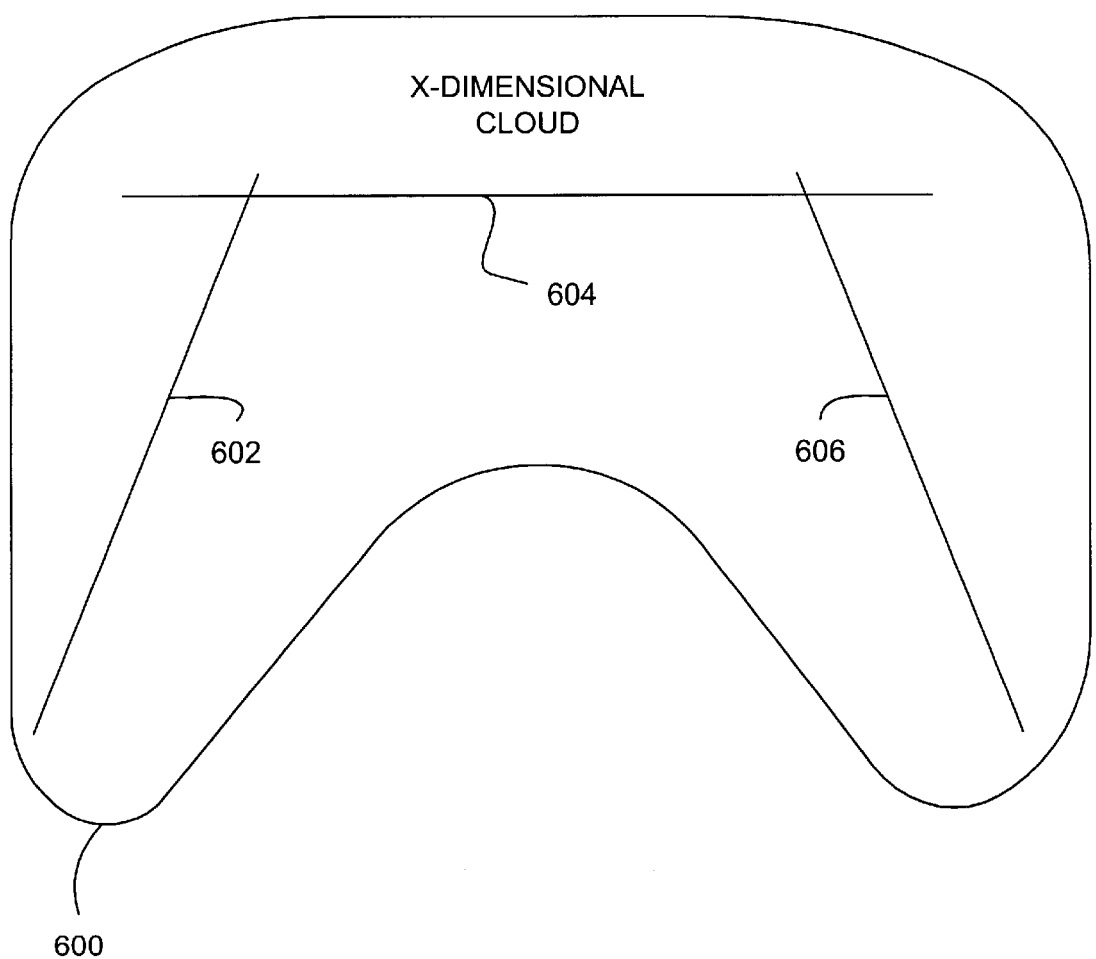
FIG. 6 is a diagram of a data space or "cloud" that can be represented as a superposition of planes, such that the data distribution can be modelled using a mixture of Bayesian PCA, in accordance with embodiments of the invention.

In this section of the detailed description, application of Bayesian PCA to mixtures is described. Mixtures, as known within the art, are useful when the data set to be analyzed is non-planar. An example of such a data set is shown in FIG. 6. The x-dimensional data set 600, or data "cloud," because of its shape, is not easily represented by a planar structure. Therefore, instead a mixture of planar structures is used, such as the mixture of planes 602, 604 and 606, to represent the data set 600, so that it can be analyzed. The superposition of the planes 602, 604 and 606 thus represent the data set 600. Each plane 602, 604 and 606 can be referred to as a component; furthermore, each component may have a different optimal dimensionality. Therefore, application of Bayesian PCA to mixtures such as that shown in FIG. 6 is now described.

Given a probabilistic formulation of PCA, a mixture distribution comprising a linear superposition of principal component analyzes is constructed. In the case of maximum likelihood PCA, both the number M of components and the latent space dimensionality q for each component must be specified. For moderate numbers of components and data spaces of several dimensions, however, it quickly becomes intractable to explore the exponentially large number of combinations of q values for a given value of M. Thus, Bayesian PCA provides a significant advantage in allowing the effective dimensionalities of the models to be determined automatically.

Figure 8:
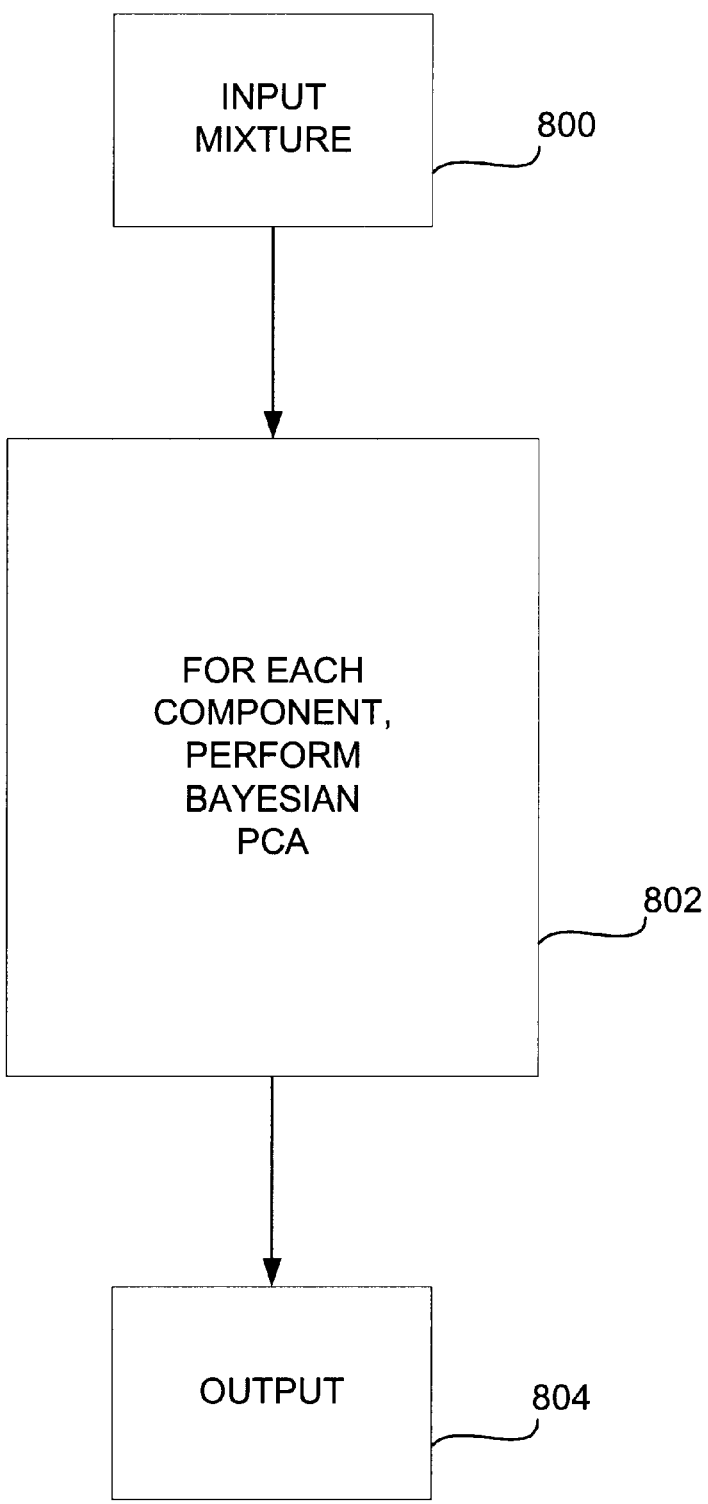
FIG. 8 is a flowchart of a method to perform Bayesian PCA on mixtures, according to another embodiment of the invention.

This is accomplished by selecting a number of components in the mixture, and then performing Bayesian PCA as to each component, independently, as can be appreciated by those of ordinary skill within the art. This can be implemented in one embodiment as a computer-implemented method, a flowchart of which is shown in FIG. 8. In 800, a mixture distribution having an already selected number of components is input. The mixture set may be input by being received from a communications device, from a storage device, etc.; the invention is not so limited. The data space desirably represents a real-world event or events—for example, the stories read by users of a web site, the television shows watched by viewers, etc.

In 802, for each component within the mixture, Bayesian PCA is performed. More particularly, in one embodiment of the invention, a maximum number of principal components for each component is determined—that is, an optimal dimensionality for each component is determined. In one embodiment, this is accomplished as has already been described in conjunction with FIG. 9—that is, where each component can be conceptualized as a separate data model, having its own prior distribution, etc. The invention is not necessarily so limited, however.

Finally, in 804, the results are output; for example, the model is output, or the maximum number of principal components is output. The invention is not limited to the manner by which output is accomplished. For example, in one embodiment, it can be output to a further analysis program or software component, that allows for analysis and conclusions to be drawn. As another example, the output can be displayed on a display device, or printed to a printer, etc.

Figure 7:
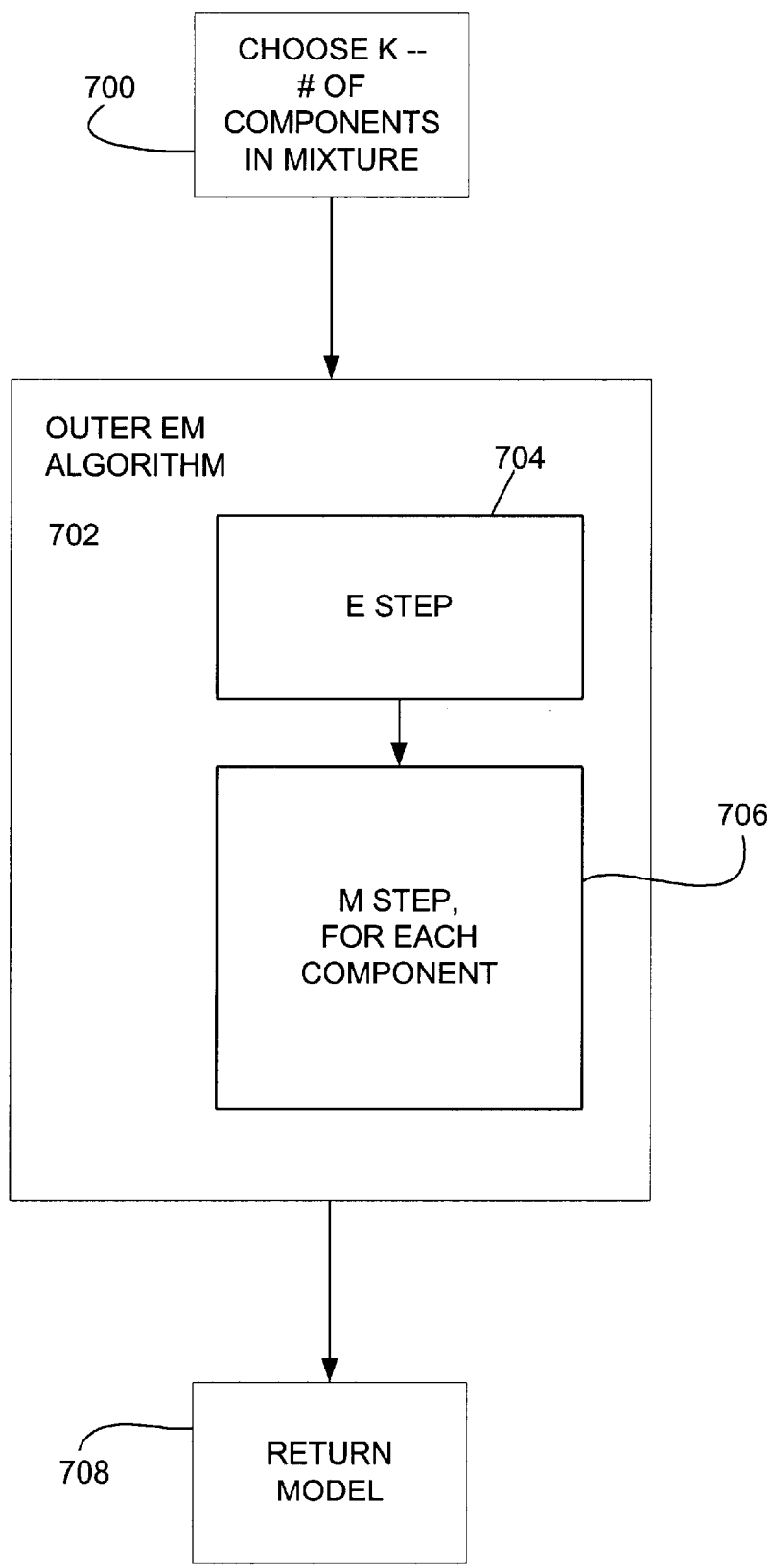
FIG. 7 is a flowchart of a method to perform Bayesian PCA on mixtures, according to an embodiment of the invention.

A more specific embodiment of the invention as applied to mixtures is now described in conjunction with FIG. 7. The method of FIG. 7 is particularly comparable to the type II maximum likelihood of method FIG. 3, as can be appreciated by those of ordinary skill within the art. In 700, a k is chosen, which represents the number of components in the mixture. (Not shown in FIG. 7 is that the mixture distribution is first input; input can be accomplished in a manner as has already been described.) In 702, an outer EM algorithm is performed. More specifically, in 704, the E part of the EM algorithm is performed, as to the mixture as a whole. Then, in 706, the M part of the EM algorithm is performed for each component I . . . k. Once the EM algorithm has been performed, the resulting model is returned or otherwise output in 708 (output can be accomplished in a manner as has already been described). It is noted, as can be appreciated by one of ordinary skill within the art, can itself be one of FIG. 3, FIG. 4, or FIG. 5.

As can be appreciated by those of ordinary skill within the art, the computer-implemented methods of FIG. 7 and 8 are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Conclusion

Bayesian PCA has been described. Although specific embodiments have been illustrated and described herein, it will be appreciated by those of ordinary skill in the art that any arrangement which is calculated to achieve the same purpose may be substituted for the specific embodiments shown. For example, while embodiments of the invention have been explained largely in reference to the EM algorithm, the invention itself is not necessarily so limited. This application is intended to cover any adaptations or variations of the present invention. Therefore, it is manifestly intended that this invention be limited only by the following claims and equivalents thereof.

I claim:

1. A computer-implemented method for performing Bayesian Principal Component Analysis comprising:
   inputting a data model;
   receiving a prior distribution of the data model;
   determining a posterior distribution based at least in part upon the prior distribution;
   generating output data of optimal dimensionality based on the posterior distribution and Principal Component Analysis; and,
   outputting the output data.

2. The method of claim 1, wherein generating output data comprises generating a data model.

3. The method of claim 1, wherein generating output data comprises generating a plurality of principal components.

4. The method of claim 1, wherein generating output data comprises generating a distribution.

5. The method of claim 1, wherein receiving the prior distribution comprises receiving one of a hierarchical and a non-hierarchical prior distribution.

6. The method of claim 1, wherein generating output data comprises determining a predictive density, including an optimal density of the data model, by marginalizing the posterior distribution over parameters of the data model.

7. The method of claim 6, wherein determining the predictive density comprises performing a Laplace approximation in conjunction with type II maximum likelihood.

8. The method of claim 6, wherein determining the predictive density comprises performing a Markov chain Monte Carlo simulation based on Gibbs sampling.

9. The method of claim 6, wherein determining the predictive density comprises performing a variational inference based on an approximation to the posterior distribution using a factorized distribution.

10. A computer-implemented method comprising:
    inputting a first data model of continuous variables;
    receiving a prior distribution of the first data model;
    determining a posterior distribution based at least in part upon the prior distribution;
    generating a second data model of optimal dimensionality based on the posterior distribution and Principal Component Analysis; and,
    outputting the second data model.

11. A computer-implemented method comprising:
    inputting a mixture of a data space having a number of components;
    determining a maximum number of principal components for each component of the mixture utilizing Bayesian Principal Component Analysis; and,
    outputting the maximum number of principal components for each component of the mixture.

12. The method of claim 11, wherein determining the maximum number of principal components comprises:
    receiving a prior distribution of the component;
    determining a posterior distribution; and,
    determining a predictive density, including an optimal density of the component, by marginalizing the posterior distribution over parameters of the component.

13. The method of claim 12, wherein determining the predictive density comprises performing a Laplace approximation in conjunction with type II maximum likelihood.

14. The method of claim 12, wherein determining the predictive density comprises performing a Markov chain Monte Carlo simulation based on Gibbs sampling.

15. The method of claim 12, wherein determining the predictive density comprises performing a variational inference based on an approximation to the posterior distribution using a factorized distribution.

16. A machine-readable medium having instructions stored thereon for execution by a processor to perform a method comprising:
    inputting a data model;
    receiving a prior distribution of the data model;
    determining a posterior distribution based at least in part upon the prior distribution;
    generating output data of an optimal dimensionality based on the posterior distribution; and
    outputting the data model.

17. The medium of claim 16, wherein generating output data comprises generating a data model.

18. The method of claim 16, wherein generating output data comprises generating a plurality of principal components.

19. The method of claim 16, wherein generating output data comprises generating a distribution.

20. The method of claim 16, wherein receiving the prior distribution comprises receiving one of a hierarchical and a non-hierarchical prior distribution.

21. The method of claim 16, wherein generating output data comprises determining a predictive density, including an optimal density of the data model, by marginalizing the posterior distribution over parameters of the data model.

22. A computerized system comprising:

a data model having a prior distribution;

output data of an optimal dimensionality selected from the group essentially consisting of: a second data model, a distribution, and a plurality of principal components; and, a generator to generate the output data based on the data model and the prior distribution thereof, by determining a posterior distribution based on the data model and the prior distribution.

23. The system of claim 22, wherein at least one of the data model and the output data is stored as data on a computer-readable medium.

24. The system of claim 22, wherein the generator comprises a computer program executed by a processor from a computer-readable medium.

25. A data modeling system, comprising:

a data model having a prior distribution; and, a generator operative utilizing Bayesian Principal Component Analysis to generate output data based upon the data model and at least one of a second data model, a distribution and a plurality of principal components.

* * * * *